May 26, 1959 J. P. HAMMES 2,888,619
SEMICONDUCTOR DEVICES
Filed May 20, 1955
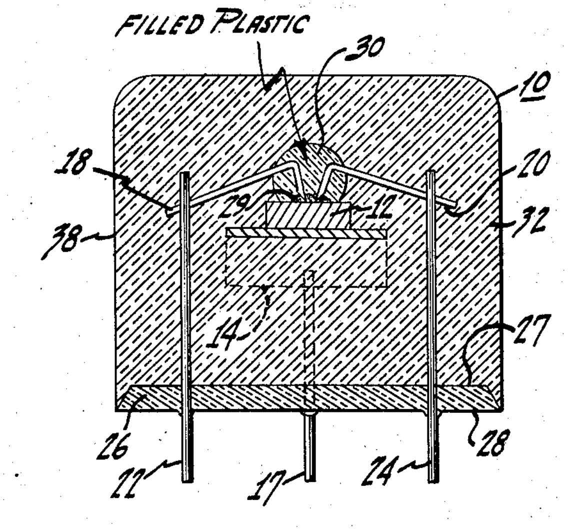
INVENTOR.
JOHN P. HAMMES
BY J. L. Whittaker
ATTORNEY United States Patent Office 2,888,619

Patented May 26, 1959

2,888,619

SEMICONDUCTOR DEVICES

John P. Hammes, Belleville, N.J., assignor, by mesne assignments, to the United States of America as represented by the Secretary of the Army Application May 20, 1955, Serial No. 509,860

3 Claims. (Cl. 317—235)

This invention pertains to point contact transistors and to an improved potting and mounting arrangement therefor.

In point contact transistors, the emitter and collector electrodes comprise stiff wires or catwhiskers which are critically spaced from each other in contact with a crystal of semiconductor material. Ordinarily, in the manufacture of such devices, the various parts are assembled and potted in some type of protective material and then one or both of the emitter and collector electrodes is electrically treated (formed) to improve their operating characteristics. However, sometimes the devices are deteriorated by this treatment due to breakdown of the protective material.

An object of the invention is to improve the operating characteristics of point-contact transistors.

Another object is to reduce the back-current characteristics of point-contact transistors.

A further object is to provide improved methods of and means for potting and mounting point-contact semiconductor devices.

The foregoing and other purposes and objects are achieved in accordance with the invention as related to assembling the parts of a point contact transistor, by first spacing the emitter and collector catwhiskers on the surface of a semiconductor crystal and then covering the tips of the catwhiskers and the portion of the crystal surface immediately adjacent thereto with a small quantity of an electrically insulating, chemically-inert fluid material having good chemical stability at high temperatures such as a silicone fluid. A larger quantity of a plastic material having a coefficient of expansion the same as or similar to that of the point contact electrodes is then molded about the semiconductor crystal and a considerable length of the catwhisker electrodes in contact therewith.

The transistor is then plotted in a large body of plastic material or in a metal housing or the like and one or both of the catwhiskers is electroformed. The presence of the small quantity of chemically inert fluid effectively shields the plastic plotting material during the electroforming process, and effectively reduces back-current leakage characteristics.

The invention is described in greater detail by reference to the drawing wherein the single figure is a sectional elevational view of a point contact transistor prepared according to the principles of the invention.

Referring to the drawing, a point contact transistor 10 embodying the principles of the invention includes a crystal 12 of semiconductor material, for example germanium or silicon of N-type or P-type conductivity, soldered in low resistance, or ohmic contact, to a metallic supporting member 14 which comprises the base electrode of the completed transistor. The member 14 may be of brass, or the like, and may be generally L or T shaped including a crystal supporting portion 15 and a portion 16 depending at right angles thereto. A stiff wire or pin 17 of conducting material, such as nickel, is soldered or otherwise secured to the depending portion of the member 14 to provide electrical contact with the block 12.

The transistor 10 also includes point contact or catwhisker electrodes 18 and 20 which are operated as the emitter and collector electrodes in the completed device and which preferably consist of fine wires having sharpened contact points. Wires 18 and 20 may, for example, be of steel, tungsten or Phosphor bronze, or the like, and may have a diameter of a few mils and a point diameter of the order of two tenths of a mil. The wires are soldered or welded to supporting wires 22 and 24, which may also be of nickel or some similar conductive material.

The supporting wires 17, 22, and 24 are mounted on an insulating supporting member or stem 26 which may be of glass, plastic, or the like, through which the wires extend. The stem 26 has two substantially parallel planar surfaces 27 and 28. The ends of the wires extending below the member 26 may be used as electrical contact terminals or pins and they may be spaced in such a manner that they will fit, for example, a sub-miniature tube socket.

According to the invention, a small quantity of an electrically insulating, chemically inert fluid 29 chemically stable at high temperatures (e.g. of the order of over 500° C.) is placed between and around the catwhiskers 18 and 20 so that the portion of the crystal affected by a later electroforming operation in the vicinity of the catwhisker electrodes is coated thereby. Substantially any silicone fluid material is suitable for the purposes of the invention. Silicone is the generic name for a wide variety of polymers having the basic structure of alternate silicon and oxygen atoms, with the silicon atoms carrying organic groups bound directly to them. The silicones, in general, have remarkable heat stability and have a high degree of water repellency, excellent dielectric properties and resistance to oxidation, ozone and many chemicals.

The preferred material, for use in practicing the present invention, is a silicone fluid which is less likely to be affected by electric current than a solidified resin might be. For example, where arc-over might form a permanent current leakage path in a solidified resin, it would generally not affect a silicone fluid. One specific type of silicone fluid is known as Dow-Corning DC–200 fluids. The DC–200 fluids are crystal clear inert liquids characterized by their excellent thermal stability and low viscosity-temperature coefficients; their pour points range from −123° to −47° F.; they are very resistant to oxidation and shear-breakdown; they are highly water repellent; and they have excellent dielectric properties. Other suitable materials are liquid perfluorinated hydrocarbons, such as perfluorinated tributyl amine.

In addition, in order to protect the germanium crystal 12 and its associated catwhisker electrodes 18 and 20, a matrix 30 comprising an organic potting medium is molded around the crystal and the electrodes. The potting material of the matrix 30 may be any suitable substance which has a coefficient of expansion comparable to those of the various components of the transistors, i.e. the stem 26 and the various electrodes. One class of materials suitable for the purposes of this invention are synthetic resins known as the Araldites. In general, it may be stated that "Araldites" are condensation products of poly-arylepoxy-ethane compounds and the derivatives of such polymers and they include varieties which harden at room temperature and others which are cured and set at elevated temperatures.

The mechanical and chemical properties of Araldite have been described in a paper by Preiswerk, Meyerhans and Denz, which appears in "Materials and Methods" October 1949, and by Preiswerk and Meyerhans in "Electrical Manufacturing" July 1949. Further information on the chemical composition of Araldite will be found in a paper by Ott which appears in "Schweizer Archiv" January 1949, pages 23–31 (a translation of this paper has been published by The Technical Service Department, Aero Research Limited, Duxford, Cambridge, England, which is entitled "Aero Research Technical Notes," Bulletin No. 75, March 1949). In this connection reference is made to the Patents 2,324,483 and 2,444,333 to Castan which disclose examples of Araldite resins.

In order to improve the characteristics of the resin constituting the matrix 30, a filler of pellets of electrically insulating material, for example of glass, plastic or the like which are substantially spherical in form is dispersed therein. The coefficient of expansion of the matrix 29 heated in this way is favorably reduced. For the purposes of this invention, the filler spheres, preferably, have a diameter in the range of 10 to 80 microns. A sufficient number of the smallest spheres are provided to fill the interstices between the largest spheres. By this means, the maximum amount of filler may be provided to achieve maximum reduction in thermal coefficient of expansion while retaining desirably low viscosity and workability of the resin. The spheres may be added in an amount up to 80% by weight with the range of 50% to 80% by weight being preferred for the type of device described above.

One suitable method of achieving the desired distribution of filler according to size is to prepare a first quantity of pellets having diameters in the range of 10 to 30 microns and a second quantity of pellets having diameters in the range of 30 to 80 microns. One suitable mixture is three parts of the small spheres to one part of the large spheres. For Araldite CN501, glass filler of 10 to 80 microns in diameter in an amount 50% by weight reduces the thermal coefficient of expansion from about $50\times10^{-6}$ units/unit/° C. to about $27\times10^{-6}$ units/unit ° C.

The entire transistor is then potted in a body 32 of a suitable insulating material, for example, an Araldite resin, or a silicone material, or the like.

After the transistor has been potted, the collector catwhisker electrode is electrically formed by a conventional electrical pulsing operation. If desired, the emitter catwhisker is also electroformed and other processing operations may be performed as required until the transistor is ready for use.

A device prepared as described above exhibits favorable operating characteristics when electroformed, for example by a method of the type described in U.S. Patent 2,686,279. This result is believed due to the fact that the electroformed portion of the semiconductor crystal 12 is protected by the chemically inert material which prevents high back current in operation of the transistor.

What is claimed is:

1. A semiconductor device comprising a transistor assembly including a body of semiconducting material and a pair of catwhisker electrodes in contact with a surface of said body, a small quantity of an electrically insulating, chemically inert, high temperature stable organic medium in contact with said surface of said body only in the immediate vicinity of said catwhiskers and embedding the ends of said catwhiskers which are in contact with said surface, and a quantity of an electrically insulating, and a plastic protective medium covering said surface of said body and a considerable length of said catwhiskers.

2. A semiconductor device comprising a transistor assembly including a body of semiconducting material and a pair of catwhisker electrodes in contact with a surface of said body, a small quantity of silicon fluid in contact with said surface of said body only in the immediate vicinity of said catwhiskers and embedding the ends of said catwhiskers which are in contact with said surface, and a quantity of an electrically insulating, plastic protective medium covering said surface of said body and a considerable length of said catwhiskers.

3. A semiconductor device comprising a transistor assembly including a body of semiconducting material and a pair of catwhisker electrodes in contact with a surface of said body, at least one of said electrodes being electroformed, a small quantity of an electrically insulating, chemically inert, high temperature stable organic medium in contact with said surface of said body only in the immediate vicinity of said catwhiskers and embedding the ends of said catwhiskers which are in contact with said surface, said high temperature stable organic medium being selected from the group consisting of silicone fluids and liquid perfluorinated hydrocarbons, and a quantity of an electrically insulating, plastic protective medium covering said surface of said crystal and a considerable length of said catwhiskers, said plastic protective medium including a filler of small, substantially spherical pellets.

References Cited in the file of this patent

UNITED STATES PATENTS

| | | |
|---|---|---|
| 2,475,940 | Brittain | July 12, 1949 |
| 2,688,110 | Domaleski et al. | Aug. 31, 1954 |
| 2,704,340 | Baird | Mar. 15, 1955 |
| 2,716,722 | Rothstein | Aug. 30, 1955 |
| 2,751,529 | Stineman et al. | June 19, 1956 |